US012031803B2

(12) United States Patent
Mathis et al.

(10) Patent No.: US 12,031,803 B2
(45) Date of Patent: Jul. 9, 2024

(54) WEDGE SYSTEM FOR CHARACTERIZATION OF FRAGMENTATION FROM WARHEADS DURING ARENA TESTING

(71) Applicant: Southwest Research Institute, San Antonio, TX (US)

(72) Inventors: James T Mathis, Fair Oaks Ranch, TX (US); Matthew V. Grimm, San Antonio, TX (US); Nicholas J. Mueschke, San Antonio, TX (US); Edward V. O'Hare, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 361 days.

(21) Appl. No.: 17/581,951

(22) Filed: Jan. 23, 2022

(65) Prior Publication Data

US 2023/0235998 A1 Jul. 27, 2023

(51) Int. Cl.
| G06K 9/00 | (2022.01) |
| F42B 35/00 | (2006.01) |
| G06T 7/207 | (2017.01) |
| F42B 12/20 | (2006.01) |

(52) U.S. Cl.
CPC .............. *F42B 35/00* (2013.01); *G06T 7/207* (2017.01); *F42B 12/20* (2013.01); *G06T 2207/10016* (2013.01); *G06T 2207/30241* (2013.01)

(58) Field of Classification Search
CPC .......... F42B 35/00; F42B 12/20; G06T 7/207; G06T 2207/10016; G06T 2207/30241; F41J 13/00
See application file for complete search history.

(56) References Cited

U.S. PATENT DOCUMENTS

| 8,285,528 | B1 * | 10/2012 | Szymanski | ............. G06F 30/20 703/6 |
| 10,030,957 | B2 * | 7/2018 | Flynn | ...................... F42B 35/00 |
| 10,627,385 | B2 * | 4/2020 | McArthur | ............ G01N 33/227 |
| 11,421,963 | B2 * | 8/2022 | Inglefield | ................ F42B 35/00 |

FOREIGN PATENT DOCUMENTS

KR 101827222 B1 * 2/2018 ............... G01L 5/14

* cited by examiner

*Primary Examiner* — Shervin K Nakhjavan
(74) *Attorney, Agent, or Firm* — Livingston Law Firm

(57) ABSTRACT

An arena test system for characterizing fragments from a warhead. An entry panel and an exit panel are arranged in a wedge configuration with a wedge-shaped air space between them. Fragments are imaged as they pass through this wedge. A soft catch box is located behind the exit panel such that fragments that pass through the exit panel enter the soft catch box and are decelerated within the soft catch box.

12 Claims, 3 Drawing Sheets

WEDGE SYSTEM FOR CHARACTERIZATION OF FRAGMENTATION FROM WARHEADS DURING ARENA TESTING

GOVERNMENT SUPPORT CLAUSE

This invention was made with United States Government Support under Contract No. DOTC-17-01-init1435 funded by the DoD Ordnance Technology Consortium. The Government has certain rights in this invention.

TECHNICAL FIELD OF THE INVENTION

This patent application relates to testing the lethality of weapon systems, and more particularly to characterizing fragments expelled by fragmenting munitions.

BACKGROUND OF THE INVENTION

The U.S. Air Force and other branches of the military conduct specialized tests termed "arena tests" to study the lethality and collateral effects of weapon systems. Data from these tests is used to populate databases whose information may be used in weapon prediction tools.

Arena tests are used for those systems whose primary lethality and damage mechanism is fragmentation from the explosive breakup of a warhead case or the explosive launch of pre-formed fragments. For lethality assessment, the data required from fragmenting weapons includes fragment size, mass, shape, material, speed, and trajectory.

Ideally, this fragment data would be obtained for each individual fragment. However, sometimes tens of thousands of fragments are generated during a single warhead test. With existing technology, it is not possible to collect and measure all fragments.

Currently, lethality data from fragmenting munitions is collected using arena tests conducted in accordance with the Joint Technical Coordinating Group for Munitions Effectiveness (JTCG/ME) procedures. Using an instrumented arena, the number of, size distribution, velocity, and dispersion of a subset of the fragments from a test warhead is determined. This subset of fragments is collected using soft-catch materials that slow down and capture the fragments so they can be recovered and weighed after the test.

In conventional arena tests, witness panels (also referred to as "flash panels") are positioned on the opposite side of the arena and intersect a subset of the fragments. A fragment striking a witness panel creates a flash of light created that is imaged using high-speed video cameras focused on the back surface of the panel. Timing and distance information is then used to calculate the average velocity of fragments striking the panel. Another method of measuring fragment velocity is with electronic "make screens", which produce an electronic signal when impacted by a fragment.

In conventional arena testing, the fragments that are recovered in the soft catch and the fragments whose velocity are being measured with witness panels normally come from two opposing sides of the warhead. Through symmetry assumptions, the velocity and mass can be related in a stochastic sense, but not upon an individual basis. The data is gathered into fragment size and velocity bins and presented in a standard format known as "Z-data".

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As described in the Background, the lethality and damage effectiveness of advanced warheads is evaluated by characterizing a warhead's fragments. The following description is directed to an arena test system that provides a means for characterizing fragmentation from warheads, including measurement of instantaneous fragment velocity, trajectory, and mass.

The invention recognizes and solves problems with conventional arena testing. It provides a method and system to measure and relate an individual fragment's mass to its velocity. It further allows for instantaneous velocity measurement of fast fragments or velocity measurement of fragments that are moving slower than the shock wave generated from the blast. This scenario can exist when warheads have multi-modal fragment velocity distributions, such as a warhead having both naturally formed fragments and pre-formed fragments. Conventional witness panels are typically destroyed after passage of the faster fragments and blast wave and therefore are no longer in place to intersect slower moving fragments. The invention allows characterization of larger fragments and/or slow-moving fragments, either of which may not fully penetrate conventional soft catch methods.

Figure 1:
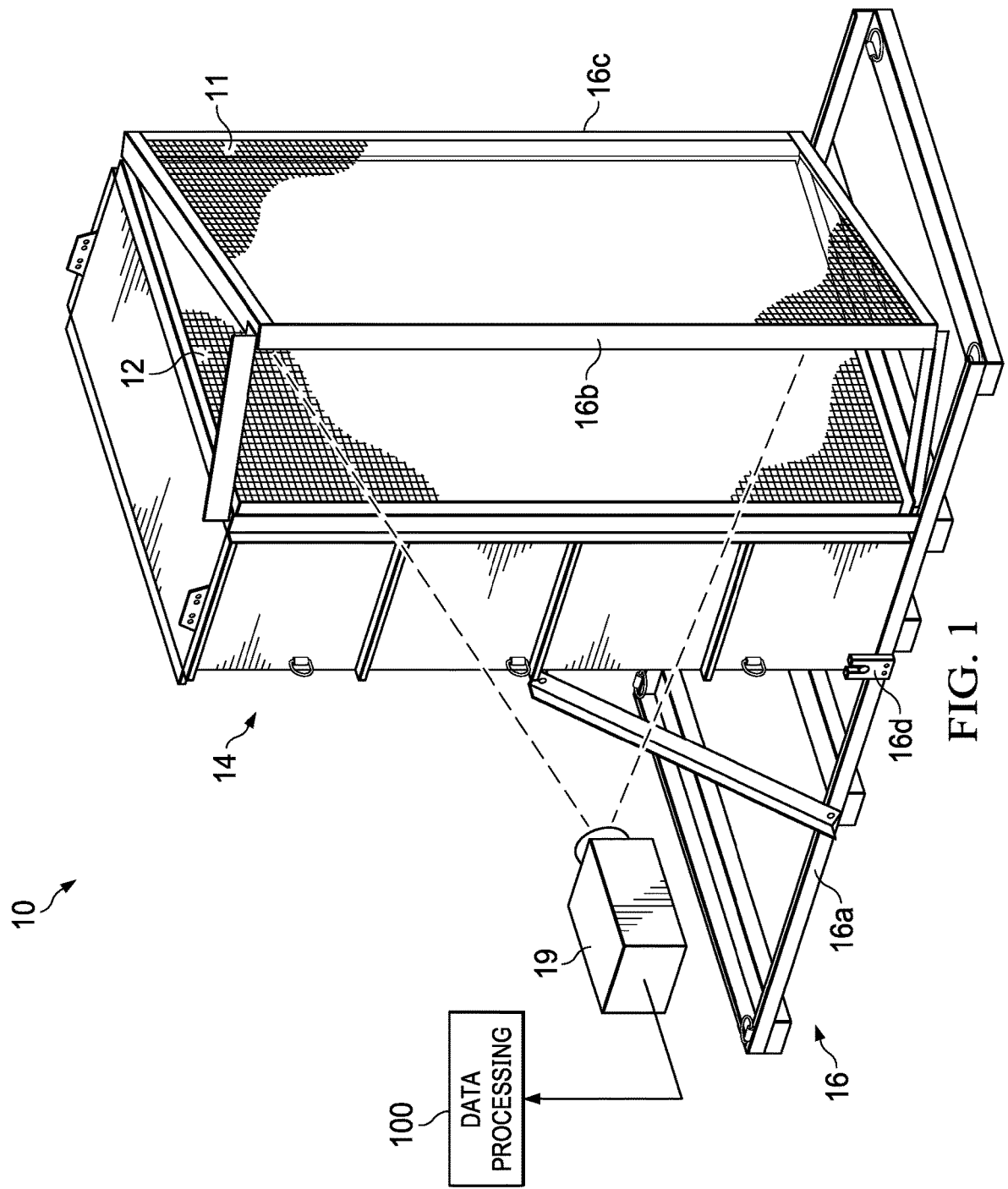
FIG. 1 is a perspective view of the wedge arena test system in accordance with the invention.

FIG. 1 illustrates an arena test system having a combination of a soft catch box and screen witness panels in accordance with the invention. For purposes of this description, this combination of soft catch box and witness panels is referred to as the "wedge arena test system" 10.

Two wire mesh witness panels 11 and 12 are arranged in a "V" or "wedge" configuration, similar to a partially open book. Fragments strike and pass through a strike witness panel 11, travel through the open space between the panels, and strike and pass through an exit witness panel 12. As illustrated, the angle between panels 11 and 12 is much less than 90 degrees, and it is expected that this angle will typically range from 15 to 45 degrees.

As explained in further detail below, the purpose of the angle between witness panel 11 and witness panel 12 is so that a single video camera 19 can be used to image fragments passing through the open side of the wedge between the panels. To this end, a high-speed video camera 19 is positioned to detect fragments that impact the strike witness panel 11 and exit witness panel 12. A feature of the invention is that a single camera can be used to obtain out-of-plane velocity and trajectory components.

Witness screens 11 and 12 may be constructed from wire hardware cloth. An example of a suitable material is a 0.063-inch wire diameter×0.125-inch spacing galvanized hardware cloth.

The size of the witness panels 11 and 12 is primarily a function of how many fragments are desired to be characterized. An example of a suitable size for each panel is 8 feet wide by 12 feet high. The panels 11 and 12 are painted white to better contrast with passing fragments and to appear semi-opaque from the perspective view of the camera 19, with calibration points applied to the panels as explained below.

In operation, fragments interact and perforate the panels 11 and 12 and the perforation locations are measured with calibrated high-speed video images. The blast wave interacts with the panels; however, due to the tension on the panels and their inherent porosity, the panels allow passage of the blast wave and remain in place up to a certain level of blast impulse before being damaged.

Soft catch box 14 is located immediately behind the exit witness panel 12. As explained below, the exit witness panel 12 forms the front of the soft catch box 14.

Soft catch is an integral part of the wedge arena test system 10 as it allows recovery of fragments and correlation to measured impacts on the exit panel 12. This facilitates fragment-to-fragment correlation of both physical location/velocity/trajectory to the recovered fragment mass. As explained below in connection with FIG. 3, soft catch box 14 comprises layered materials that allow for capturing both fast-moving and slow-moving fragments. The materials and layers used for soft catch box 14 may be selected as a result of laboratory gun-launched fragment testing. The soft catch box described herein has demonstrated the ability to soft-catch fragments traveling as slow as approximately 70 meters per second.

Witness panels 11 and 12 and soft catch box 14 are all supported within a support frame 16. Support frame 16 has a horizontal portion 16a, which provides a structural base that endures static loads due to gravity and dynamic blast loads. Frame 16 also has a vertical portion 16b that frames the wire mesh screens of panels 11 and 12 and thereby provides a means to mount and retain the screens during static and blast loads, as well as to provide pre-tension to the screens.

An example of a suitable frame 16 is one made from structural steel angle iron. The vertical portion 16b allows witness panels 11 and 12 to open into a wedge shape during testing and may have a vertical hinge 16c for this purpose. Hinge 16c further allows for adjustment of the opening angle between screens 11 and 12. When the test system 100 is not in use, hinge 16c allows the panels 11 and 12 to lie flat against each other. This opening angle is adjusted and tuned to match settings used with camera 19. A second hinge 16d at the base of frame 16 allows the vertical portion 16b to lie flat to facilitate installation of the mesh screens 11 and 12.

In this manner, frame 16 secures the witness panels 11 and 12 to the front of soft catch box 14. It also provides a means for allowing the wedge opening between panels 11 and 12 to be opened, closed, and adjusted in angle.

Figure 2:
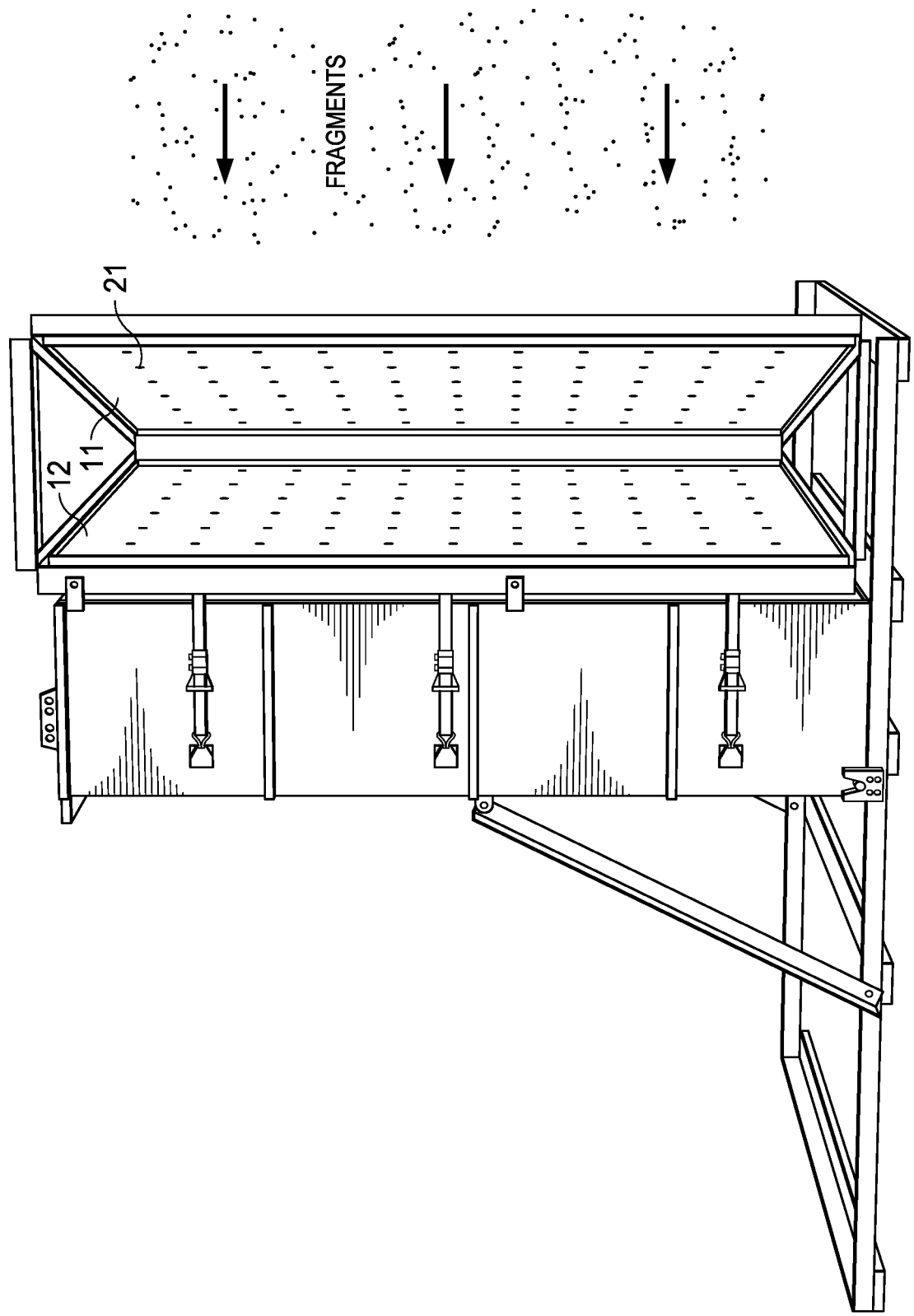
FIG. 2 illustrates calibration points on the exit side of the entry panel and on the entry side of the exit panel.

FIG. 2 is a perspective view of wedge arena test system 10, looking into the open "v" between the wedge witness screens 11 and 12. The field of view of camera 19 is focused on faces of screens 11 and 12 that face into this "v".

Calibration points 21 are painted on both panel 11 and panel 12. They are placed on the exit side of panel 11 and the entry side of panel 12 and can be seen by camera 19 as fragments strike and pass through the panels.

During arena testing, fragments generated from a warhead intersect with the panels. The fragments are visible to camera 19 from the open side of the wedge and are imaged using camera 19 as they intersect the entry panel 11, pass through the wedge, and intersect the exit panel 12.

The size and spacing of calibration points 21 may vary. In the example of this description each calibration point is a 1-inch black dot, and they are spaced at 12-inches on center in a grid pattern.

Calibration points 21 allow for post-processing of high-speed video images, and ultimately the measurement of fragment impact location in three-dimensional space on the planes of the witness panels. Data from camera 19 is used to track the fragment impact location on the witness panels, as well as to measure fragment velocity as it progresses from the first to second witness panel. Using the known calibration points of entry and exit between the panels, and a known distance between them, and time of flight data, a fragment's velocity may be calculated.

Spatial measurements at the strike face (witness panel 11) and exit face (witness panel 12) are combined to determine individual fragment trajectory. The temporal information from the high-speed camera frame rate is utilized to measure individual fragment velocity. Trajectory measurements can be extrapolated back to the point of origin to determine the source location of the fragment. This allows a fragment's individual instantaneous velocity and trajectory to be measured.

Figure 3:
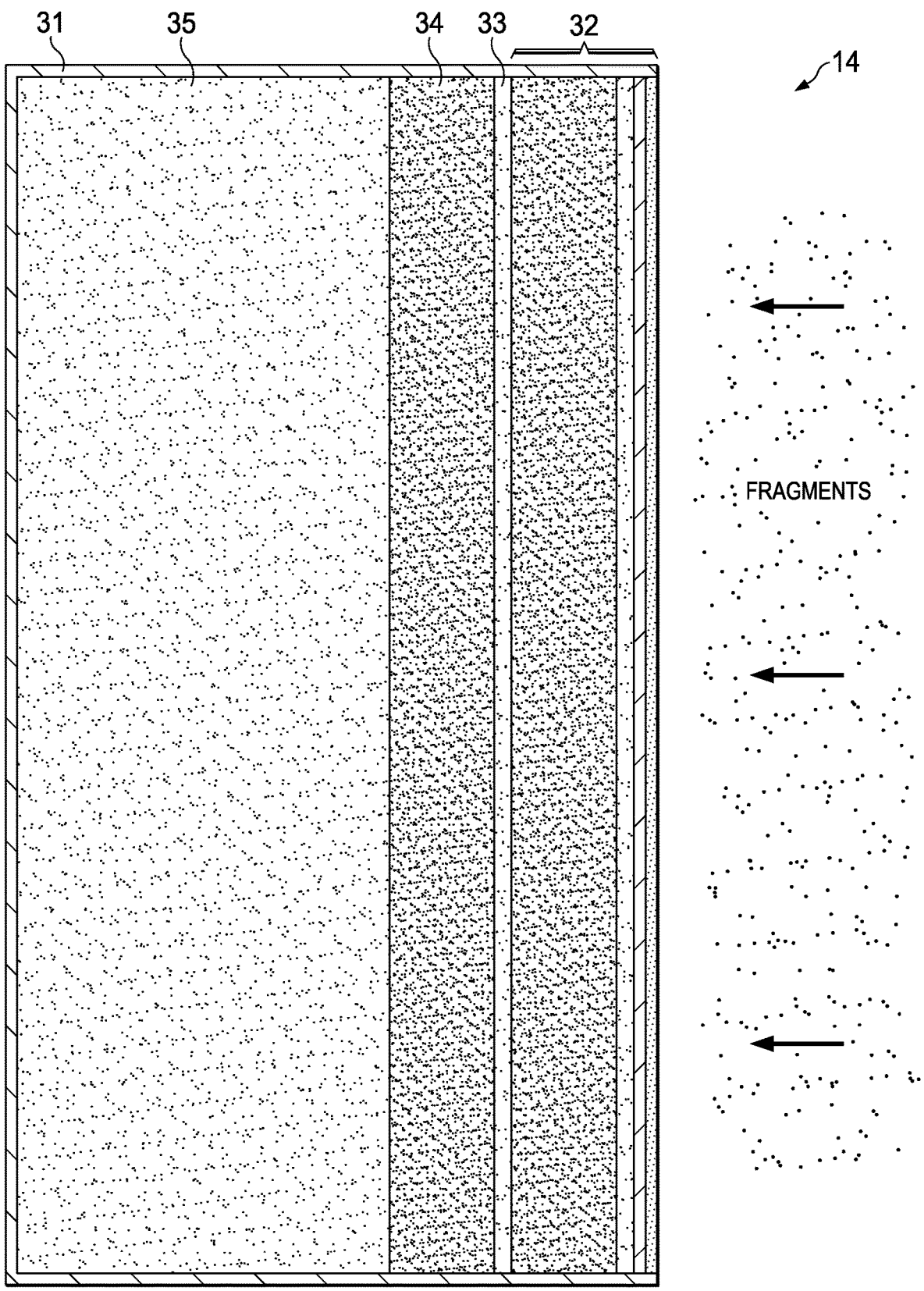
FIG. 3 illustrates an example of layers within the soft catch box.

FIG. 3 is a cut-away view of soft catch box 14. Soft catch box 14 has a rigid container 31, open at the front side of catch box 14, which supports and contains various layers of soft catch materials. These materials are specifically designed to capture and retain high-speed and low-speed fragments.

The layers that initially present to the fragments perform the function of capturing and retaining the slow-moving fragments. These are referred to herein as the slow-moving soft catch layers 32. In the example of this description, these layers comprise a first layer of foam board, then a plywood layer, then fiberboard, then an insulation layer.

The thicknesses of these layers are respectively, 3/16 inch, 1/4 inch, 1/2 inch, and 6 inches. An example of a suitable insulation layer is a Rockwool (mineral wool) material, which is fire resistant.

The next layer is a second fiberboard layer 33. If fragments rebound from this layer 33, they are caught within the preceding insulation layer for later recovery.

Faster-moving fragments that pass through the initial layers 32 and layer 33, next pass through another insulation layer 34 and are then decelerated in a solid stack layer of fiberboard 35 for post-test recovery. An example of a suitable thickness for fiberboard layer 35 is 24 inches.

The fiberboard layers of soft catch box 14 may be any type of engineered wood product. Types of fiberboard (in order of increasing density) include particle board or low-density fiberboard (LDF), medium-density fiberboard (MDF), and hardboard (high-density fiberboard, HDF). An example of a suitable fiberboard is an insulation board, such as Celotex, manufactured from fine wood fibers and a binder.

Referring again to FIG. 2, measurement of a fragment's impact location on the exit witness panel 12 provides a reference to the location where the fragment can be recovered from the soft-catch box 14. Recovery of fragments from the soft catch box 14 can be used to effectively link each individual fragment's measured mass with its velocity and trajectory measured with the wedge witness screens 11 and 12.

Referring again to FIG. 1, a data processing unit 100 has hardware and software appropriate for performing the fragment characterization tasks described above. It receives video data from camera 19 and calculates instantaneous fragment velocity and/or trajectory and/or position. Processing unit 100 may further receive post-test still image data of screens 11 and 12 for these measurements.

Fragment trajectory is determined from observation of multiple video frames. Extrapolation methods can be used to estimate the source location of fragments. The intersection of at extrapolated lines from at least two fragments indicates source location.

What is claimed is:

1. An arena test system for characterizing fragments from a warhead, comprising:
    an entry panel made from a wire mesh material that allows the fragments to pass through;
    an exit panel made from a wire mesh material that allows the fragments to pass through after they pass through the entry panel;
    wherein the entry panel and the exit panel are arranged in a wedge configuration with a wedge-shaped air space between them;
    a soft catch box located behind the exit panel such that fragments that pass through the exit panel enter a front side of the soft catch box and are decelerated within the soft catch box; and
    a frame that contains the soft catch box, holds the exit panel to the front side of the soft catch box, and holds the entry panel and the exit panel in the wedge configuration when the arena test system is in use.

2. The arena test system of claim 1, wherein the frame has a hinged portion that allows the entry panel to be folded against the exit panel when the test system is not in use and opened relative to the exit panel when the test system is in use.

3. The arena test system of claim 1, wherein the warhead also produces a blast wave, and the entry panel and the exit panel further allow the blast wave to pass through.

4. The arena test system of claim 1, further comprising calibration marks on an exit side of the entry panel and/or on an entry side of the exit panel.

5. The arena test system of claim 1, wherein the soft catch box has a first set of layer(s) of materials for capturing and retaining slow moving fragments, and second set of layer(s) of material for rebounding fragments into the first set of layer(s), and a third set of layer(s) of material for decelerating and capturing faster moving fragments.

6. A method of characterizing a sample of fragments from a warhead, comprising:
    arranging an entry panel and an exit panel in a wedge configuration with a wedge-shaped air space between them;
    wherein each panel is made from a wire mesh material that allows the fragments to pass through;
    wherein a back side of the entry panel and a front side of the exit panel are marked with calibration points;
    capturing image data representing images of at least one fragment along a path through the entry panel, through the air space between the panels, and through the exit panel; and
    using the calibration points and the image data to locate the path and/or to calculate the velocity of the at least one fragment.

7. The method of claim 6, further comprising placing a soft catch box behind the exit panel such that fragments that pass through the exit panel enter and are decelerated within the soft catch box.

8. The method of claim 7, further comprising collecting fragments from the soft catch box and determining their mass.

9. The method of claim 8, further comprising correlating velocity to mass of at least one fragment.

10. The method of claim 6, further comprising using data from multiple video frames to determine a trajectory of at least one fragment.

11. The method of claim 10, further comprising extrapolating trajectory data of at least two fragments to estimate a source location of the fragments.

12. The method of claim 6, wherein the entry panel and the exit panel have a hinged attachment and the arranging step is performed by opening the hinge.

* * * * *